United States Patent
Lan et al.

(10) Patent No.: US 10,445,277 B1
(45) Date of Patent: Oct. 15, 2019

(54) SWITCH CARD CAPABLE OF SIMPLIFYING WIRING CONFIGURATION AND SERVER WITH THE SWITCH CARD

(71) Applicant: Wistron Corporation, New Taipei (TW)

(72) Inventors: Guo-Jia Lan, New Taipei (TW); Yu-Chieh Huang, New Taipei (TW); Meng-Ju Tsai, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/057,845

(22) Filed: Aug. 8, 2018

(30) Foreign Application Priority Data

May 31, 2018 (TW) .............................. 107118628 A

(51) Int. Cl.
*G06F 13/00* (2006.01)
*G06F 13/40* (2006.01)
*G06F 13/16* (2006.01)

(52) U.S. Cl.
CPC ...... *G06F 13/4022* (2013.01); *G06F 13/1668* (2013.01)

(58) Field of Classification Search
CPC .......................... G06F 13/4022; G06F 13/1668
See application file for complete search history.

(56) References Cited

U.S. PATENT DOCUMENTS

| | | | | |
|---|---|---|---|---|
| 8,693,208 | B2 * | 4/2014 | Reinke | G06F 1/185 361/679.4 |
| 9,436,234 | B1 * | 9/2016 | Felton | G06F 1/185 |
| 2008/0065798 | A1 * | 3/2008 | Lu | G06F 9/4411 710/104 |
| 2010/0199011 | A1 * | 8/2010 | Chen | G06F 13/4022 710/301 |
| 2014/0298079 | A1 * | 10/2014 | Dean | G06F 12/0246 714/4.5 |
| 2015/0261710 | A1 * | 9/2015 | Billi | G06F 13/4022 710/316 |
| 2016/0255740 | A1 * | 9/2016 | Ping | G06F 13/362 710/301 |

* cited by examiner

*Primary Examiner* — Jing-Yih Shyu
(74) *Attorney, Agent, or Firm* — JCIPRNET

(57) ABSTRACT

A switch card and a server are provided. The switch card is adapted to couple a riser card and a hard drive array, and includes a storage device, a processing circuit, a first connection portion, and a plurality of first sub-connection portions. When the first connection portion is coupled to the riser card, the processing circuit receives a setting signal of the riser card via the first connection portion. The processing circuit reads a configuration table stored in the storage device according to the setting signal. When the first sub-connection portions are coupled to a plurality of second sub-connection portions of the hard drive array, the second sub-connection portions are coupled to a plurality of hard drives of the hard drive array via a plurality of first cables. The processing circuit determines a configuration setting between the first cables and the hard drives according to the configuration table.

20 Claims, 3 Drawing Sheets

SWITCH CARD CAPABLE OF SIMPLIFYING WIRING CONFIGURATION AND SERVER WITH THE SWITCH CARD

CROSS-REFERENCE TO RELATED APPLICATION

This application claims the priority benefit of Taiwan application serial no. 107118628, filed on May 31, 2018. The entirety of the above-mentioned patent application is hereby incorporated by reference herein and made a part of this specification.

BACKGROUND OF THE INVENTION

1. Field of the Invention

The invention relates to an internal structure design of a server, and particularly relates to a switch card and a server.

2. Description of Related Art

Generally speaking, a server includes a server motherboard and a hard drive array. The server motherboard needs a riser card and a switch card to be connected to a hard drive array. Since a plurality of hard drives of the hard drive array need to be respectively connected to the riser card and the switch card, the switch card need a plurality of cables (also referred to as signal lines) to be connected to the hard drives. However, how the cables are wired on the back plate of the hard drive array needs to be determined according to the hard drive numbers and the digital signal processor numbers set in default. Therefore, when the server motherboard is connected to a different hard drive array, the wiring of these cables on the printed circuit board (PCB) of the back plate of the hard drive array may become very complicated. As a result, the cable lengths of these cables are increased, and the design and manufacturing cost of the server is also increased.

For example, how the cables are wired on the printed circuit board of the back plate of the hard drive array having a fewer number of hard drives is determined by a specific configuration table stored in the switch card. However, in the common case, if the server motherboard is connected to another hard drive array having a greater number of hard drives, the switch card needs to be replaced by another corresponding switch card for the server, so that the wiring of the cables on the printed circuit board of the back plate of the hard drive array having a greater number of hard drives can be configured according to another corresponding specific configuration table, so that the wiring of these cables does not become more complicated, or the required cable length is not increased. In other words, in the common case, the traditional server cannot cope with hard drive arrays of different types with a single switch card. Therefore, it usually requires a higher design and manufacturing cost when setting up the traditional server. Considering the above, several solutions are proposed in the embodiments described in the following.

SUMMARY OF THE INVENTION

One or some exemplary embodiments of the invention provides a switch card and a server capable of simplifying the wiring configuration of a plurality of cables on a back plate of a hard drive array and thereby reducing the winding length of these cables.

A switch card according to an embodiment of the invention is adapted to couple a riser card and a hard drive array. The switch card includes a storage device, a processing circuit, a first connection portion, and a plurality of first sub-connection portions. The storage device stores at least one configuration table. The processing circuit is coupled to the storage device. The first connection portion is coupled to the processing circuit. When the first connection portion is coupled to the riser card, the processing circuit receives a setting signal of the riser card via the first connection portion, and the processing circuit reads the at least one configuration table stored in the storage device according to the setting signal. The first sub-connection portions are coupled to the processing circuit. When the first sub-connection portions are coupled to a plurality of second sub-connection portions of the hard drive array, the second sub-connection portions are coupled to a plurality of hard drives of the hard drive array via a plurality of first cables. The processing circuit determines a configuration setting between the plurality of first cables and the plurality of hard drives according to the at least one configuration table.

A server according to an embodiment of the invention includes a riser card, a hard drive array, a switch card, and a motherboard. The hard drive array includes a plurality of hard drives. The switch card includes a storage device, a processing circuit, a first connection portion, and a plurality of first sub-connection portions. The storage device stores at least one configuration table. The processing circuit is coupled to the storage device. The first connection portion is coupled to the processing circuit. When the first connection portion is coupled to the riser card, the processing circuit receives a setting signal of the riser card via the first connection portion, and the processing circuit reads the at least one configuration table stored in the storage device according to the setting signal. The first sub-connection portions are coupled to the processing circuit. When the first sub-connection portions are coupled to a plurality of second sub-connection portions of a hard drive array, the second sub-connection portions are coupled to a plurality of hard drives of the hard drive array via a plurality of first cables. The processing circuit determines a configuration setting between the plurality of first cables and the plurality of hard drives according to the at least one configuration table. A second connection portion of the riser card is coupled to the motherboard.

Based on the above, the switch card and the server according to the embodiments of the invention are suitable for a plurality of hard drive arrays with different numbers of hard drives arranged according to the peripheral component interconnect express (PCIe) standard and respectively providing corresponding simplified wiring configurations of the cables disposed on the back plate of the hard drive arrays for different hard drive arrays. In this way, the wiring length of the cables on the printed circuit board (PCB) can be effectively reduced. Therefore, the switch card and the server according to the embodiments of the invention are able to effectively reduce the design and manufacturing cost of the server.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
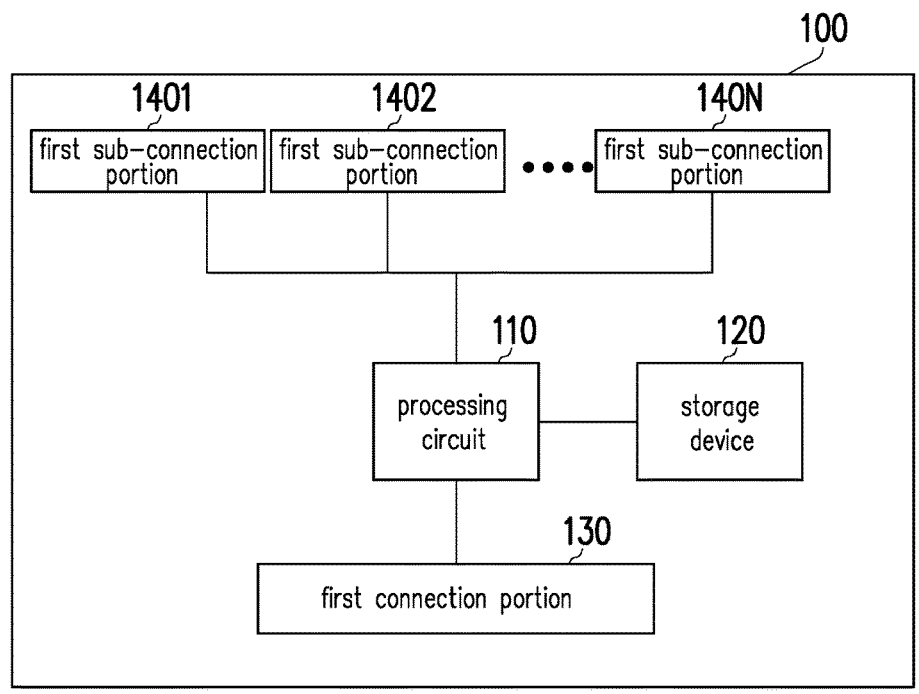
FIG. 1 is a block diagram illustrating a switch card according to an embodiment of the invention.

In order to make the invention more comprehensible, embodiments are described below as the examples to show the invention. Moreover, elements/components/steps with same reference numerals represent same or similar parts in the drawings and embodiments.

FIG. 1 is a block diagram illustrating a switch card according to an embodiment of the invention. Referring to FIG. 1, a switch card 100 includes a processing circuit 110, a storage device 120, a first connection portion 130, and a plurality of first sub-connection portions 1401 and 1402 to 140N. The processing circuit 110 is coupled to the storage device 120, the first connection portion 130, and the first sub-connection portions 1401 and 1402 to 140N. In the embodiment, the switch card 100 may be adapted to couple a riser card, a hard drive array and a motherboard of the server. The switch card 100 may be coupled to the riser card and the motherboard of the server through the first connection portion 130, and may also be coupled to a plurality of hard drives of the hard drive array through the first sub-connection portions 1401 and 1402 to 140N. The switch card 100 may serve to expand the number of channels of the bus of the motherboard of the server. For example, the motherboard of the server is compatible with the PCIe interface and provides 8 PCIe transmission channels. The switch card 100 is coupled to a slot of the motherboard of the server through the riser card, so as to expand the 8 PCIe channels of the motherboard to 32 PCIe channels. In other words, if each hard drive of the hard drive array needs four PCIe channels, the switch card 100 may be coupled to 8 hard drives through the first sub-connection portions 1401 and 1402 to 140N.

In the embodiment, the storage device 120 serves to store one or more configuration tables. When the first connection portion 130 is coupled to the riser card, the processing circuit 110 receives a setting signal of the riser card via the first connection portion 130, and the processing circuit 110 reads one of the one or more configuration tables stored in the storage device 120 according to the setting signal. In the embodiment, the first sub-connection portions 1401 and 1402 to 140N are coupled to a plurality of second sub-connection portions of a back plate of the hard drive array via a plurality of cables (also referred to as signal wirings), and the second sub-connection portions are coupled to the hard drives through another plurality of cables. In the embodiment, the configuration connecting the second sub-connection portions and another plurality of the hard drives may be determined according to the configuration table. In other words, since the type of the riser card is determined by how the hard drives of the hard drive array are arranged, different hard drive arrays are suitable for different riser cards. In the embodiment, the switch card 100 is able to automatically detect the type of the riser card and chooses the corresponding configuration table.

In the embodiment, the processing circuit 110 includes a processor. The processor may be a central processing unit (CPU), a system-on-chip (SoC), or other programmable general purpose or specific purpose microprocessors, digital signal processors (DSPs), programmable controllers, application specific integrated circuits (ASICs), programmable logic devices (PLDs), other similar processing devices, or a combination thereof. However, the invention is not limited thereto.

In the embodiment, the storage device 120 may include one or more memories. The memory may be a non-transitory computer-readable recording medium. The non-transitory computer-readable recording medium may be a read-only memory (ROM), an erasable programmable read-only memory (EPROM), or an electrically-erasable programmable read-only memory (EEPROM), etc. The invention does not intend to impose a limitation on this regard. In addition, in the embodiment, each memory serves to store a configuration table.

In the embodiment, the first connection portion 130 and the first sub-connection portions 1401 and 1402 to 140N are compatible with the peripheral component interconnect express (PCIe) standard or other bus standards. However, the invention is not limited thereto. In an embodiment, the first connection portion 130 and the first sub-connection portions 1401 and 1402 to 140N are also compatible with a universal serial bus (USB) or a serial advanced technology attachment (SATA) bus, etc.

Figure 2:
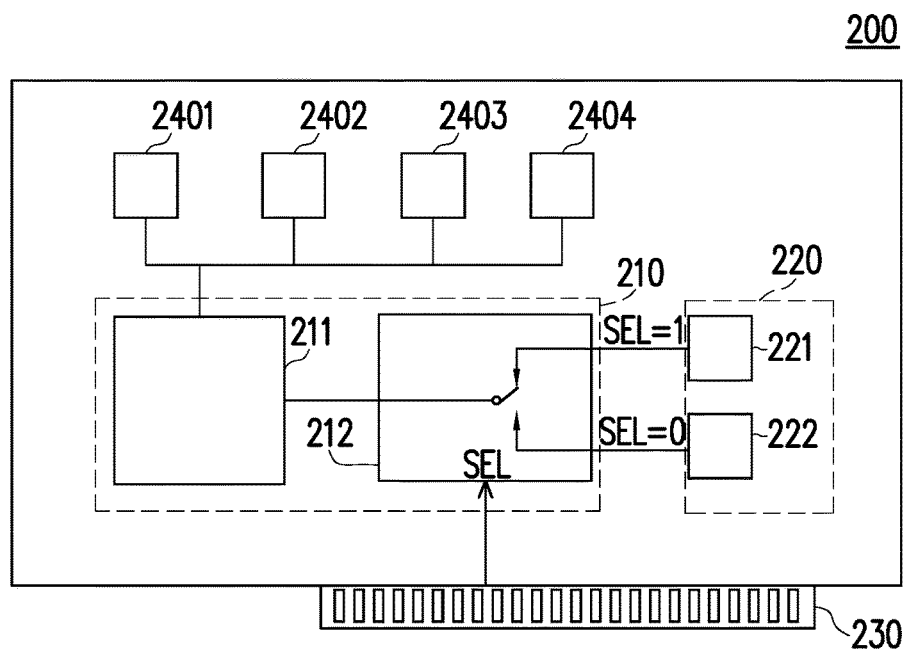
FIG. 2 is a schematic diagram illustrating a switch card according to an embodiment of the invention.

FIG. 2 is a schematic diagram illustrating a switch card according to an embodiment of the invention. Referring to FIG. 2, a switch card 200 includes a processing circuit 210, a storage device 220, a first connection portion 230, and a plurality of first sub-connection portions 2401 to 2404. The switch card 200 includes a circuit board. The first connection portion 230 is located at a side of the circuit board, and the first connection portion 230 includes a plurality of metal terminals. For example, the first connection portion 230 is a gold finger (G/F). In the embodiment, the processing circuit 210 includes a processor 211 and a control circuit 212. The storage device 220 includes memories 221 and 222. The processor 211 is coupled to the first connection portion 230 and the first sub-connection portions 2401 to 2404, and the control circuit 212 is coupled to the memories 221 and 222 and the first connection portion 230. In the embodiment, the memories 221 and 222 respectively store different configuration tables. When the first connection portion 230 is coupled to a riser card, the control circuit 212 receives a setting signal SEL of the riser card via the first connection portion 230, and the processor 211 reads the configuration table stored in one of the memories 221 and 222 according to the setting signal SEL.

In the embodiment, the control circuit 212 may include a switch circuit, so that the control circuit 212 may determine whether to connect the processor 211 to the memory 221 or the memory 222 according to the setting signal SEL of the riser card. For example, when the switch card 200 is coupled to a specific type of riser card via the first connection portion 230, the first connection portion 230 provides the setting signal SEL (SEL=1) to the control circuit 212, and the control circuit 212 connects the processor 211 to the memory 221. However, when the switch card 200 is coupled to another specific type of riser card via the first connection portion 230, the first connection portion 230 provides the setting signal SEL (SEL=0) to the control circuit 212, and the control circuit 212 connects the processor 211 to the memory 222.

Figure 3:
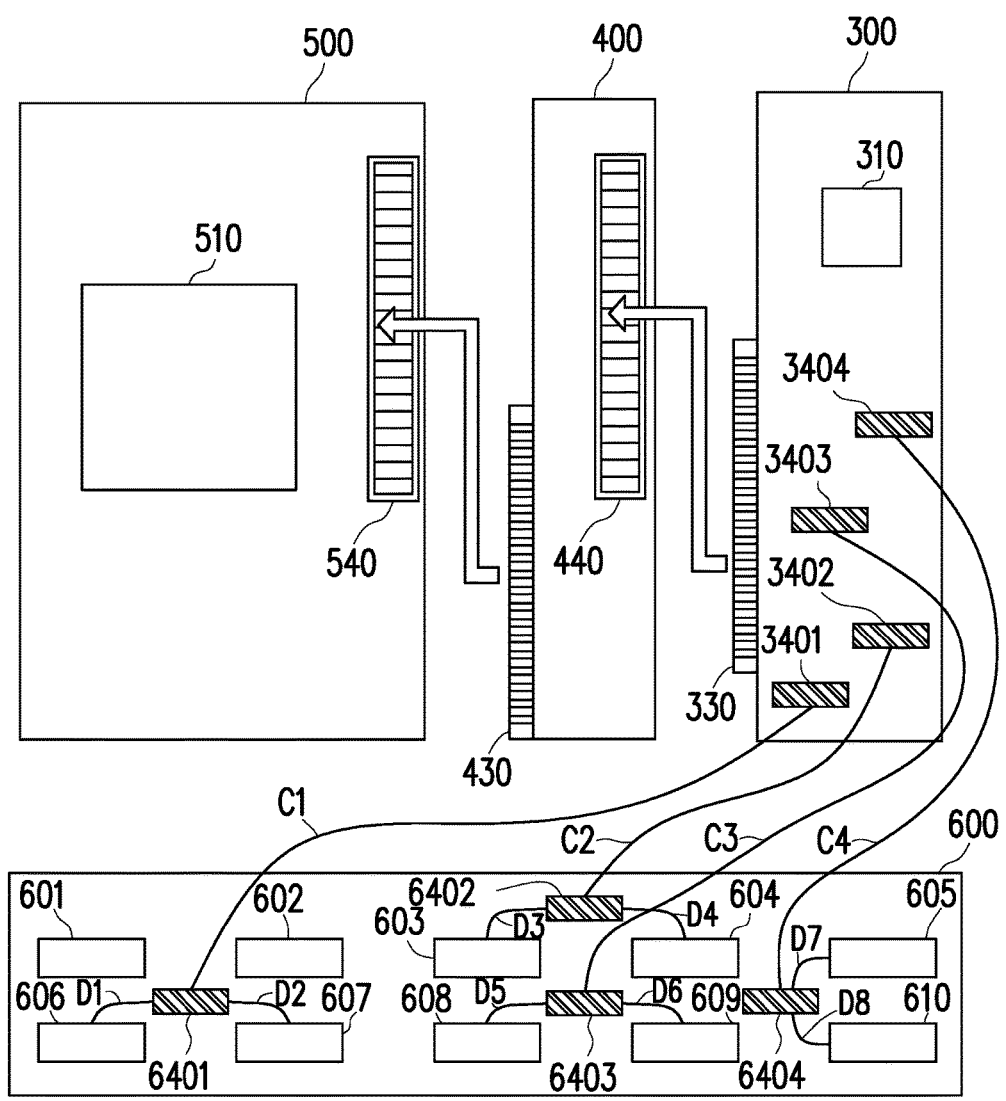
FIG. 3 is a schematic diagram illustrating a server according to an embodiment of the invention.

FIG. 3 is a schematic diagram illustrating a server according to an embodiment of the invention. Referring to FIG. 3, a server 30 includes a switch card 300, a riser card 400, a motherboard 500, and a hard drive array 600. In FIG. 3, the switch card 300, the riser card 400, and the motherboard 500 are, for example, illustrated as schematic side views of the respective circuit boards, and the hard drive array 600 is, for example, illustrated as a schematic view of a back plate. In the embodiment, a processor 310 of the switch card 300 may determine the type of the riser card 400 according to the setting signal provided by the first connection portion 330, and thereby determine the corresponding configuration table to be read. In the embodiment, the switch card 300 may be combined with a slot 440 of the riser card 400 through the first connection portion 330, and the riser card 400 may be combined with a slot 540 of the motherboard 500 through a second connection portion 430. The first connection portion 330 and the second connection portion 430 are gold fingers.

In the embodiment, a plurality of first sub-connection portions 3401 to 3404 of the switch card 300 are coupled to a plurality of second sub-connection portions 6401 to 6404 of the back plate of the hard drive array 600 through a plurality of cables C1 to C4. The matching between the first sub-connection portions 3401 to 3404 and the second sub-connection portions 6401 to 6404 is determined according to the configuration table read by the processor 310. In addition, the second sub-connection portions 6401 to 6404 are coupled to hard drives 603 to 610 of the hard drive array 600 through cables D1 to D8. The wiring configuration of the cables D1 to D8 is determined by the configuration table read by the processor 310. In the embodiment, the number of the cables C1 to C4 is less than the number of the cables D1 to D8.

For example, the motherboard 500 may provide 8 PCIe channels, and the processor 510 of the motherboard 500 is directly coupled to two hard drives 601 and 602 of the hard drive array 600. The switch card 300 and the riser card 400 are mounted to the motherboard 500. The switch card 300 is able to automatically detect the number of channels available in the motherboard 500, so as to determine the corresponding number of channels provided to the hard drive array 600. The switch card 300 serves to expand the 8 PCIe channels provided by the motherboard 500 to 32 PCIe channels. In other words, the number of channels provided by the switch card 300 to the second sub-connection portions 6401 to 6404 is greater than the number of channels between the switch card 300 and the riser card 400. In addition, each of the first sub-connection portions 3401 to 3404 and the cables C1 to C4 provides 8 PCIe channels, so that each of the second sub-connection portions 6401 to 6404 provides 8 PCIe channels to the hard drive array 600. Since each of the hard drives 603 to 610 needs 4 PCIe channels, the second sub-connection portions 6401 to 6404 are respectively coupled to two of the hard drives 603 to 610 via the cables D1 to D8. In this case, the configuration table read by the processor 510 may be as shown in Table 1 below.

| Second sub-connection portion | Configuration setting | |
|---|---|---|
| Second sub-connection portion 6401 | Hard drive 606 | DSP#4 |
| | Hard drive 607 | DSP#5 |
| Second sub-connection portion 6402 | Hard drive 603 | DSP#1 |
| | Hard drive 604 | DSP#2 |

-continued

| Second sub-connection portion | Configuration setting | |
|---|---|---|
| Second sub-connection portion 6403 | Hard drive 608 | DSP#6 |
| | Hard drive 609 | DSP#7 |
| Second sub-connection portion 6404 | Hard drive 605 | DSP#3 |
| | Hard drive 610 | DSP#8 |

In the example, the hard drives 603 to 610 are set in default to respectively correspond to different digital signal processor numbers DSP#1 to DSP#8. Therefore, in Table 1, the second sub-connection portions 6401 to 6404 respectively correspond to two of the hard drives 603 to 610, and the hard drives 603 to 610 are set in default to sequentially correspond to the digital signal processor numbers DSP#1 to DSP#8. In other words, based on the configuration table shown in Table 1, the user may connect the cables D1 and D2 between the hard drives 606 and 607 and the second sub-connection portion 6401, connect the cables D3 and D4 between the hard drives 603 and 604 and the second sub-connection portion 6402, connect the cables D5 and D6 between the hard drives 608 and 609 and the second sub-connection portion 6403, and connect the cables D7 and D8 between the hard drives 605 and 610 and the second sub-connection portion 6404. Therefore, the second sub-connection portions 6401 to 6404 are able to be coupled to the hard drives 603 to 610 via the cables D1 to D8 in minimum distances. In other words, the wiring configuration for coupling the cables D1 to D8 to the hard drives 603 to 610 is determined according to Table 1.

Moreover, the number of channels provided by the switch card 300 of the embodiment to the second sub-connection portions 6401 to 6404 is greater than or equal to the number of channels coupled between the second sub-connection portions 6401 to 6404 and the hard drives 601 to 610. In other words, the number of hard drives and the arrangement of the hard drive array of the invention are not limited to the illustration of FIG. 3. The number of hard drives and the arrangement of the hard drive array of the invention can be designed based on different needs of the server. Besides, sufficient teaching, suggestions, and implementing instructions about the implementing details of the switch card 300 of the embodiment are already available in the embodiments of FIGS. 1 and 2. Therefore, details in these regards will not be repeated in the following.

Figure 4:
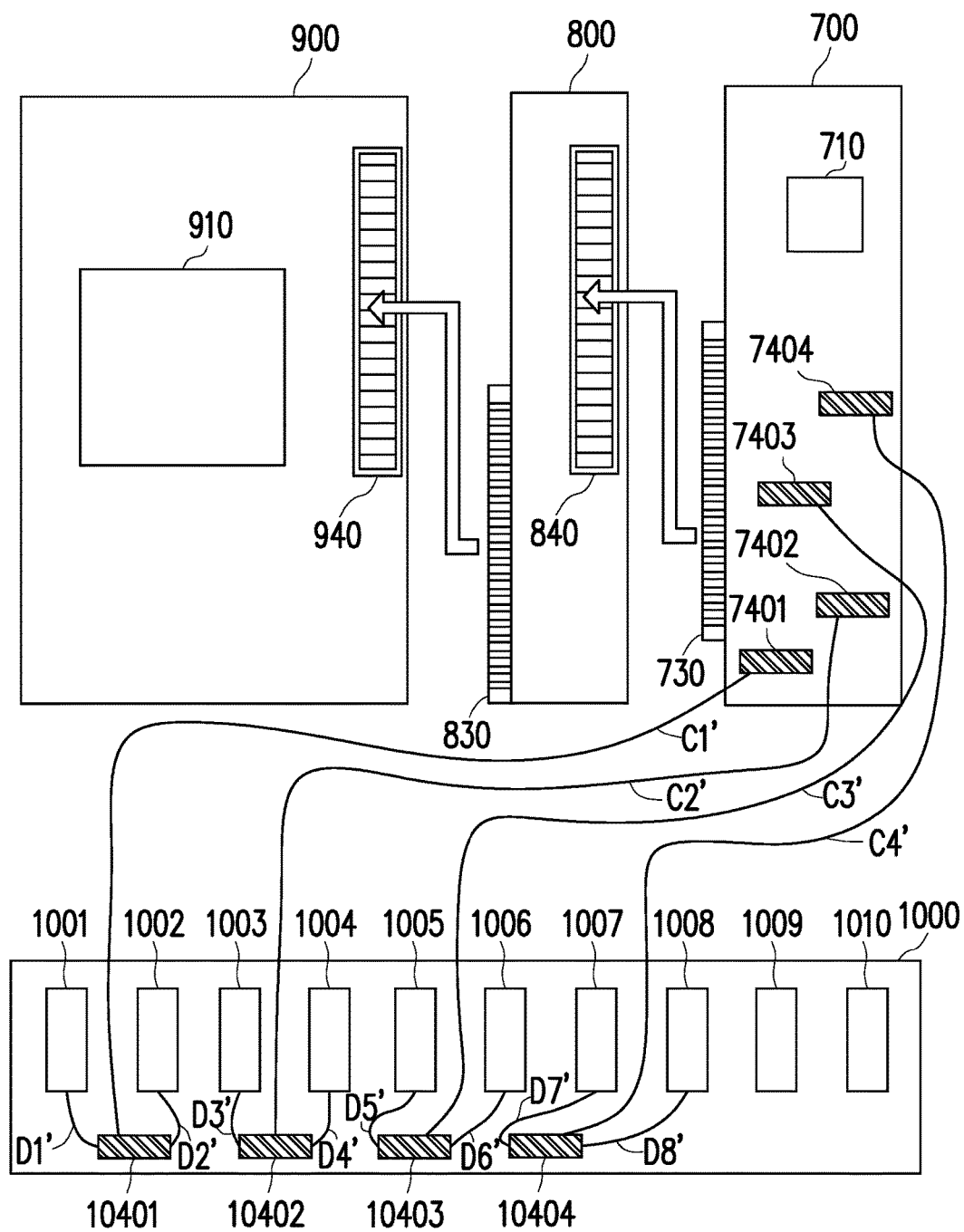
FIG. 4 is a schematic diagram illustrating a server according to another embodiment of the invention.

FIG. 4 is a schematic diagram illustrating a server according to another embodiment of the invention. Referring to FIG. 4, a server 70 includes a switch card 700, a riser card 800, a motherboard 900, and a hard drive array 1000. In FIG. 4, the switch card 700, the riser card 800, and the motherboard 900 are, for example, illustrated as schematic side views of the respective circuit boards, and the hard drive array 1000 is, for example, illustrated as a schematic view of a back plate. In the embodiment, the switch card 700 may be the switch card 300 in the embodiment of FIG. 3. However, the embodiment is not limited thereto. In the embodiment, a processor 710 of the switch card 700 is able to automatically determine the type of the riser card 800 and thereby determine the corresponding configuration table. In the embodiment, the switch card 700 may be combined with a slot 840 of the riser card 800 through the first connection portion 730, and the riser card 800 may be combined with a slot 940 of the motherboard 900 through a second connection portion 830. The first connection portion 730 and the second connection portion 830 are gold fingers.

In the embodiment, a plurality of first sub-connection portions 7401 to 7404 of the switch card 700 are coupled to a plurality of second sub-connection portions 10401 to 10404 of the back plate of the hard drive array 1000 through cables C1' to C4'. The matching between the first sub-connection portions 7401 to 7404 and the second sub-connection portions 10401 to 10404 is determined according to the configuration table read by the processor 710. In addition, the second sub-connection portions 10401 to 10404 are coupled to hard drives 1001 to 1008 of the hard drive array 1000 through cables D1' to D8'. The wiring configuration of the cables DP to D8' is determined by the configuration table read by the processor 710.

Compared with FIG. 3, since the arrangement of the hard drives is different, the switch card 700 of the embodiment of FIG. 4 is coupled to the hard drives 1001 to 1008 of the hard drive array 1000, and hard drives 1009 and 1010 are directly coupled to the processor 910 of the motherboard 900.

For example, the motherboard 900 may provide 16 PCIe channels, and the processor 910 of the motherboard 900 is directly coupled to two hard drives 1009 and 1010 of the hard drive array 1000. The switch card 700 and the riser card 800 are mounted to the motherboard 900. The switch card 700 is able to automatically detect the number of channels available in the motherboard 900, so as to determine the corresponding number of channels provided to the hard drive array 1000. Regarding those corresponding to the 8 PCIe channels in FIG. 3 in the 16 PCIe channels, the switch card 700 serves to expand the 8 PCIe channels provided by the motherboard 900 to 32 PCIe channels. In other words, the number of channels provided by the switch card 700 to the second sub-connection portions 10401 to 10404 is greater than the number of channels between the switch card 700 and the riser card 800. In addition, each of the first sub-connection portions 7401 to 7404 and the cables C1' to C4' provides 8 PCIe channels, so that each of the second sub-connection portions 10401 to 10404 provides 8 PCIe channels to the hard drive array 1000. Since each of the hard drives 1001 to 1008 needs four PCIe channels, the second sub-connection portions 10401 to 10404 are respectively coupled to two of the hard drives 1001 to 1008 via the cables D1' to D8'. In this case, the configuration table read by the processor 710 may be as shown in Table 2 below.

| Second sub-connection portion | Configuration setting | |
| --- | --- | --- |
| Second sub-connection portion 10401 | Hard drive 1001 | DSP#1 |
| | Hard drive 1002 | DSP#2 |
| Second sub-connection portion 10402 | Hard drive 1003 | DSP#3 |
| | Hard drive 1004 | DSP#4 |
| Second sub-connection portion 10403 | Hard drive 1005 | DSP#5 |
| | Hard drive 1006 | DSP#6 |
| Second sub-connection portion 10404 | Hard drive 1007 | DSP#7 |
| | Hard drive 1008 | DSP#8 |

In the example, the hard drives 1001 to 1008 are set in default to respectively correspond to different digital signal processor numbers DSP#1 to DSP#8. Therefore, in Table 2, the second sub-connection portions 10401 to 10404 respectively correspond to two of the hard drives 1001 to 1008, and the hard drives 1001 to 1008 are set in default to sequentially correspond to the digital signal processor numbers DSP#1 to DSP#8. In other words, based on the configuration table shown in Table 2, the user may connect the cables D1' and D2' between the hard drives 1001 and 1002 and the second sub-connection portion 10401, connect the cables D3' and D4' between the hard drives 1003 and 1004 and the second sub-connection portion 10402, connect the cables D5' and D6' between the hard drives 1005 and 1006 and the second sub-connection portion 10403, and connect the cables D7' and D8' between the hard drives 1007 and 1008 and the second sub-connection portion 10404. Therefore, the second sub-connection portions 10401 to 10404 are able to be coupled to the hard drives 1001 to 1008 via the cables D1' to D8' in minimum distances. In other words, the wiring configuration for coupling the cables D1' to D8' to the hard drives 1001 to 1008 is determined according to Table 2.

Compared with FIG. 3, since the arrangement of the hard drives is different, the hard drives 1001 to 1008 respectively correspond to the processor numbers DSP#1 to DSP#8. However, if the switch card 700 adopts the setting of Table 1, the second sub-connection portion 10401 needs to be coupled to the hard drives 1004 and 1005, the second sub-connection portion 10402 needs to be coupled to the hard drives 1001 and 1002, the second sub-connection portion 10403 needs to be coupled to the hard drives 1006 and 1007, and the second sub-connection portion 10404 needs to be coupled to the hard drives 1003 and 1008. In other words, the wiring configuration of the cables D to D8' is more complicated and requires a longer wiring length. Therefore, the switch card 700 of the embodiment is able to determine the corresponding configuration table to be read by determining the type of the riser card 800 corresponding to the hard drive array 1000, so as to effectively simplify the wiring configuration of the cables D1' to D8'.

Besides, sufficient teaching, suggestions, and implementing instructions about the implementing details of the switch card 700 of the embodiment are already available in the embodiments of FIGS. 1 to 3. Therefore, details in these regards will not be repeated in the following.

In view of the foregoing, the switch card and the server according to the embodiments of the invention are able to automatically determine the type of the hard drive array by detecting the riser card, so that the processor of the switch card can read the corresponding memory and obtain the corresponding configuration table. In addition, the processor of the switch card is able to set the wiring configuration of the cables on the back plate of the hard drive array by using the corresponding table. Therefore, with the switch card and the server according to the embodiments of the invention, it does not require to replace the switch card to be compatible with different types of hard drive arrays, and the wiring configuration of the cables on the printed circuit board of the back plate of the hard drive array can be effectively simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A switch card, adapted to couple a riser card and a hard drive array, comprising:
   a storage device, storing at least one configuration table;
   a processing circuit, coupled to the storage device;
   a first connection portion, coupled to the processing circuit, wherein when the first connection portion is coupled to the riser card, the processing circuit receives a setting signal of the riser card via the first connection portion, and the processing circuit reads the at least one configuration table stored in the storage device according to the setting signal; and a plurality of first sub-connection portions, coupled to the processing circuit, wherein when the first sub-connection portions are coupled to a plurality of second sub-connection portions of the hard drive array, the second sub-connection portions are coupled to a plurality of hard drives of the hard drive array via a plurality of first cables, and the processing circuit determines a configuration setting between the plurality of first cables and the plurality of hard drives according to the at least one configuration table.

2. The switch card as claimed in claim 1, wherein the storage device comprises a plurality of memories, and the plurality of memories respectively store a plurality of configuration tables, wherein the processing circuit reads one of the configuration tables according to the setting signal, and the processing circuit determines the configuration setting between the plurality of first cables and the plurality of hard drives according to the one of the configuration tables.

3. The switch card as claimed in claim 2, wherein the processing circuit comprises a processor and a control circuit, and the processor is coupled to the control circuit,
wherein the control circuit is coupled to the plurality of memories and the first connection portion to determine one of the memories being coupled to the processor according to the setting signal, such that the processor reads one of the configuration tables.

4. The switch card as claimed in claim 1, wherein the plurality of first sub-connection portions are coupled to the plurality of second sub-connection portions of the hard drive array via a plurality of second cables, and the number of the second cables is less than the number of the first cables.

5. The switch card as claimed in claim 1, wherein a type of the riser card is determined by an arrangement of the plurality of hard drives of the hard drive array.

6. The switch card as claimed in claim 1, wherein the number of a plurality of channels provided by the switch card to the second sub-connection portions is greater than the number of another plurality of channels coupled between the switch card and the riser card.

7. The switch card as claimed in claim 1, wherein the number of a plurality of channels provided by the switch card to the plurality of second sub-connection portions is greater than or equal to the number of another plurality of channels coupled between the plurality of second sub-connection portions and the plurality of hard drives.

8. The switch card as claimed in claim 1, wherein each of the second sub-connection portions is coupled to two of the hard drives of the hard drive array via the plurality of first cables.

9. The switch card as claimed in claim 1, wherein the at least one configuration table serves to record a plurality of hard drive numbers of the hard drives and a plurality of corresponding digital signal processor numbers, such that a wiring configuration for coupling the plurality of first cables to the plurality of hard drives is determined by the at least one configuration table.

10. The switch card as claimed in claim 1, wherein a second connection portion of the riser card is coupled to a motherboard, and the motherboard is directly coupled to another plurality of hard drives of the hard drive array.

11. A server, comprising:
a riser card;
a hard drive array, comprising a plurality of hard drives;
a switch card, comprising:
a storage device, storing at least one configuration table;
a processing circuit, coupled to the storage device;
a first connection portion, coupled to the processing circuit, wherein when the first connection portion is coupled to the riser card, the processing circuit receives a setting signal of the riser card via the first connection portion, and the processing circuit reads the at least one configuration table stored in the storage device according to the setting signal; and
a plurality of first sub-connection portions, coupled to the processing circuit, wherein when the first sub-connection portions are coupled to a plurality of second sub-connection portions of the hard drive array, the second sub-connection portions are coupled to a plurality of hard drives of the hard drive array via a plurality of first cables, and the processing circuit determines a configuration setting between the plurality of first cables and the plurality of hard drives according to the at least one configuration table; and
a motherboard, wherein a second connection portion of the riser card is coupled to the motherboard.

12. The server as claimed in claim 11, wherein the storage device comprises a plurality of memories, and the plurality of memories respectively store a plurality of configuration tables, wherein the processing circuit reads one of the configuration tables according to the setting signal, and the processing circuit determines the configuration setting between the plurality of first cables and the plurality of hard drives according to the one of the configuration tables.

13. The server as claimed in claim 12, wherein the processing circuit comprises a processor and a control circuit, and the processor is coupled to the control circuit,
wherein the control circuit is coupled to the plurality of memories and the first connection portion to determine one of the memories being coupled to the processor according to the setting signal, such that the processor reads one of the configuration tables.

14. The server as claimed in claim 11, wherein the plurality of first sub-connection portions are coupled to the plurality of second sub-connection portions of the hard drive array via a plurality of second cables, and the number of the second cables is less than the number of the first cables.

15. The server as claimed in claim 11, wherein a type of the riser card is determined by an arrangement of the plurality of hard drives of the hard drive array.

16. The server as claimed in claim 11, wherein the number of a plurality of channels provided by the switch card to the second sub-connection portions is greater than the number of another plurality of channels coupled between the switch card and the riser card.

17. The server as claimed in claim 11, wherein the number of a plurality of channels provided by the switch card to the plurality of second sub-connection portions is greater than or equal to the number of another plurality of channels coupled between the plurality of second sub-connection portions and the plurality of hard drives.

18. The server as claimed in claim 11, wherein each of the second sub-connection portions is coupled to two of the hard drives of the hard drive array via the plurality of first cables.

19. The server as claimed in claim 11, wherein the at least one configuration table serves to record a plurality of hard drive numbers of the hard drives and a plurality of corresponding digital signal processor numbers, such that a wiring configuration for coupling the plurality of first cables to the plurality of hard drives is determined by the at least one configuration table.

20. The server as claimed in claim 11, wherein the motherboard is directly coupled to another plurality of hard drives of the hard drive array.

\* \* \* \* \*